United States Patent [19]

Schostek

[11] Patent Number: 4,949,836
[45] Date of Patent: Aug. 21, 1990

[54] SCREW WITH WEAR RESISTANT SURFACE

[75] Inventor: Hubert Schostek, Haar, Fed. Rep. of Germany

[73] Assignee: Krauss-Maffei A.G., Fed. Rep. of Germany

[21] Appl. No.: 202,006

[22] Filed: Jun. 3, 1988

[30] Foreign Application Priority Data

Jun. 4, 1987 [DE] Fed. Rep. of Germany ....... 3718779

[51] Int. Cl.$^5$ ........................................... B65G 33/26
[52] U.S. Cl. ..................................... 198/676; 29/132; 420/453
[58] Field of Search ...................... 420/439, 441–443, 420/451–456, 448–450; 425/168; 29/132; 75/251; 198/676, 673

[56] References Cited

U.S. PATENT DOCUMENTS

| | | | |
|---|---|---|---|
| 3,845,856 | 11/1974 | Hume | 198/673 |
| 3,884,730 | 5/1975 | Hehl | 148/150 X |
| 4,173,685 | 11/1979 | Weatherly | |
| 4,556,607 | 12/1985 | Sastri | 420/442 X |
| 4,692,305 | 9/1987 | Rangaswamy et al. | 420/443 X |
| 4,727,740 | 3/1988 | Yabuki et al. | 29/132 X |
| 4,766,042 | 8/1988 | Otani | 420/442 X |
| 4,822,415 | 4/1989 | Dorfman et al. | 420/64 X |
| 4,832,912 | 5/1989 | Yabuki et al. | 420/586 |

FOREIGN PATENT DOCUMENTS

| | | |
|---|---|---|
| 2234695 | 7/1972 | Fed. Rep. of Germany . |
| 2361603 | 12/1973 | Fed. Rep. of Germany . |
| 3506726 | 2/1985 | Fed. Rep. of Germany . |
| 2954305 | 10/1985 | Fed. Rep. of Germany . |
| 3506668 | 8/1986 | Fed. Rep. of Germany . |
| 576526 | 6/1976 | Switzerland . |
| 598358 | 4/1978 | Switzerland . |
| 1394087 | 5/1975 | United Kingdom . |
| 1440333 | 6/1976 | United Kingdom . |
| 2109417 | 6/1983 | United Kingdom . |
| 2171418 | 8/1986 | United Kingdom . |
| 2171419 | 8/1986 | United Kingdom . |

OTHER PUBLICATIONS

DE-Z: Kunststoffe 69, 1979/4, S. 193.
DE-Z: Plastverarbeiter, (PV 26), 1975/8, S. 422–428.
DE-Z: Richter, Kurt. In: Schweissen and Schneiden 19, 1967, H. 9, S. 439–442.
DE-Z: Plastverarbeiter, (PV 26), 1975/1, S. 13–16.
DD-Z: Kretschmar, Eberhard. In: Schweisstechnik 15, 1965, H. 2, S. 79 bis 85.

Primary Examiner—Robert J. Spar
Assistant Examiner—D. Glenn Dayoan
Attorney, Agent, or Firm—Robert J. Koch

[57] ABSTRACT

A screw or other machine part subject to wear is provided with a wear-resistant layer comprising: 40–70% molybdenum, 0–10% chromium, 0.5–5% boron, 0–1% zirconium, 0–1% titanium, and the remainder being nickel, cobalt or mixtures of nickel and cobalt.

5 Claims, 1 Drawing Sheet

SCREW WITH WEAR RESISTANT SURFACE

BACKGROUND OF THE INVENTION

The invention concerns screws for injection molding plastic which have wear-resistant surfaces.

Protective surfaces have been used to reduce wear, improve corrosion resistance, and retard erosion. The protective surface must have a hardness that is in balance with the forces acting on the surface. This is particularly true for double screw extruders. In these extruders, the inner surface of the cylinder is exposed to high stresses concentrated in certain areas. Coatings that are too hard in these areas would accelerate the wear of the cylinder and reduce the useful life of the cylinder. Coatings with a relatively high molybdenum content are generally preferred to reduce the localized wear problems.

Armoring layers have been deposited by flame or plasma spraying (with and without subsequent sintering of the deposited layer) and welding. Between the two, welding applies a layer more firmly joined to the base metal than a layer from spraying techniques. Indeed, this inadequate adhesion frequently results in chipping or limited peeling of the protective coating. Such separation may appear after only a few hours of operation and sometimes even due to handling of the screw before installation. Rejection rates of up to 30% are expected for coated screws because the protective layer is inadequately bonded to the base metal.

The layer applied with welding typically comprises alloys of cobalt or nickel containing carbon, tungsten, chromium, boron, silicon in varying proportions. Tungsten carbide may also be added as a hard, wear-resistant layer.

SUMMARY OF THE INVENTION

It is an objective of this invention to produce an armored screw having a firmly bonded coating comprising a wear-resistant composition. It is a further objective to apply such a coating to base metal surfaces which may be the operative surface of an injection molding screw.

These objectives are attained by welding to a wear surface a wear-resistant coating comprising (by weight) about 40–70% molybdenum with or without manganese replacing a portion of the molybdenum, 0–10% chromium, about 0.5–about 5% boron, 0–1% zirconium, 0–1% titanium, and the remainder being nickel, cobalt or mixtures of nickel and cobalt. More preferred is a coating composition comprising 50–60% molybdenum, 1–8% chromium, 0.5–3% boron, 1–4% silicon, less than 0.3% carbon, 0–10% iron with the remainder being nickel. Most preferred is a coating comprising 49–51% molybdenum, 3.0–3.5% chromium, 1.1–1.4% boron, 1.8–2.25% silicon, 0.12–0.18% carbon, 0–1.5% iron, and 40.17–44.48% nickel.

The molybdenum may be partially replaced with manganese so long as the Mn/Mo weight ratio remains less than or equal to one. When so replaced, the 40–70% range will account for the combined weights of the molybdenum and the manganese.

It is advantageous to correlate the chromium content with the molybdenum content so that as the chromium content decreases as the molybdenum content increases. In other words, the chromium content is inversely proportional to the molybdenum content. When the molybdenum is present at 40 wt%, the chromium may be present up to 5 wt%. The opposite is true when the molybdenum is present at 70 wt% - the chromium may be eliminated entirely.

Boron and silicon act as fluxing agents to promote the bonding to the base metal. The total proportion of these two components should amount to 1–8%, preferably 2–5%.

Additional alloying components may be added in small amounts such as less than 3% (by weight). Zirconium and/or titanium are two such components. These agents lead to a rise in the recrystallization temperature and a reduction in crystal growth within the welded alloy layer. Such properties are important both during the welding process and any subsequent heat treatments to the piece containing the alloy layer.

One such heat treatment is hardening by nitriding. In this treatment, the piece is heated to about 500° C. in a nitriding atmosphere for about 200 hours. The hardening treatment is preferably used after the wear resistant layer has been applied to the base metal.

The wear-resistant composition may applied to the surface either as a single powder of all the components or as separate powders of different compositions. If applied separately, an alloy of chromium boron, nickel, and silicon (Cr-B-Ni-Si) may be added to an alloy comprising molybdenum and one or more of the final components whereby the total composition is adjusted to fall within the ranges set forth above. The preferred powder size for welding is 45–100 microns.

Plasma powder deposite welding is a particularly useful form of welding. In this type of welding, an arc is formed between a tungsten cathode and a hollow, water-cooled anode. The arc temperature is up to 15,000 K. Powder passing through the hollow anode forms a plasma which is deposited on the surface of the wear surface. The plasma then cools forming a coating. Plasma welding can be used for mixing materials that are otherwise very difficult to mix.

When applied to an injection molding screw, the composition is preferably deposited into a recess cut into at least one crest track of the screw. This groove or recess may be about 2mm in depth. The screw crest is generally flat thereby forming a crest track having a width of 7–50 mm. The groove lies within this track bounded on either side by a border of 1.5–3.5 mm. After deposition, the excess material may be ground down to be flush with the height of this track.

The base material may be steel of the 31 CrMoV9 or 14 CrMoV69 types although other grades may also be used depending on the part. The base material is not critical to the invention although small amounts of components from the base metal may migrate into the wear-resistant layer. Thus, the ultimate layer may contain 5–10% iron as an additonal component which will have no significant effect on the operational properties of the protective coating of the invention.

The invention will become more apparent from the examples and drawings described below. For the illustration and accompanyig description, the invention has been described with reference to an injection molding screw although many different machine parts subject to wear may be treated by the invention.

EXAMPLE 1

An alloy of the following composition is formed by melting (wt%):

60.0% Mo 3.5% Cr
1.8% B
2.5% Si
32.2% Ni

The alloy is converted into a powder by spraying into a nonoxidizing atmosphere of argon or nitrogen. The resulting powder had particles with diameters with 45-100 microns.

The powdered alloy was applied to the crest track of two screws from a double screw extruder. A flat recess of 2 mm depth was machined into the track leaving a border of approximately 2-3.5 mm. The alloy layer was deposited into this recess by plasma powder fusion welding to a depth of 2.5 mm. The excess was ground off to a layer thickness of 2 mm which was flush with the edge borders.

The layer was firmly bonded to the base material. No chipping was produced even after striking with a hammer. The screws were then installed in a double screw extruder and operated under normal conditions. An inspection after 2900 hours of operation found no appreciable wear.

EXAMPLE 2

An alloy powder of the following composition is prepared and deposited in crest track recesses of two screws as in example 1. The composition comprises (wt%):
50.0% Mo
3.5% Cr
1.8% B
2.5% Si
42.2% Ni After normal operation for 2900 hours, no appreciable wear was found.

EXAMPLE 3

An alloy of the following composition is prepared:
40% Mo
4.5% Cr
1.8% B
2.5% Si
45% Ni
3.3% Co When applied to the crest track of a screw, no appreciable wear will be found after 2900 hours of operation.

EXAMPLE 4

A coating having the following composition is prepared:
70% Mo
0% Cr
1.5% B
2.2% Si
26.3% Ni Similar to examples 1-3, when applied to the crest track of a screw, no appreciate wear will be found after 2900 hours of operation. In comparing examples 3 and 4, the relationship between the molybdenum content and the chromium content is illustrated. Higher molbdenum concentrations use less chromium to achieve the wear resistance of the invention.

DETAILED DESCRIPTION OF THE DRAWINGS

Figure 1:
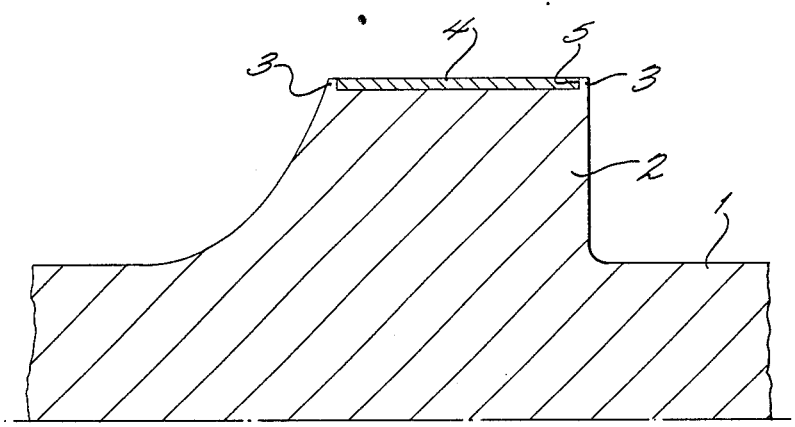
FIG. 1 illustrates a cross sectional view of one land of a screw containing the alloy according to the invention.

In FIG. 1, helical land 2 rises above screw core 1. Land 2 may be present in only certain lengths, have different widths, and/or have a variable rise along the length of screw core 1. Only a small segment is schematically shown for ease of illustration. Screw may be of virtually any size. For example, the screw may have a diameter of 60-130 mm, a length of 4 m, and acrest track width of 7-50 mm.

A flat recess 5 is worked into the crest track of land 2 beind defined on both sides by edge borders 3. Borders 3 may be 1.5-3.5 mm in width. Recess 5 is filled with wear-resistant alloy 4. Alloy 4 is preferably applied by plasma powder deposite welding.

Figure 2:
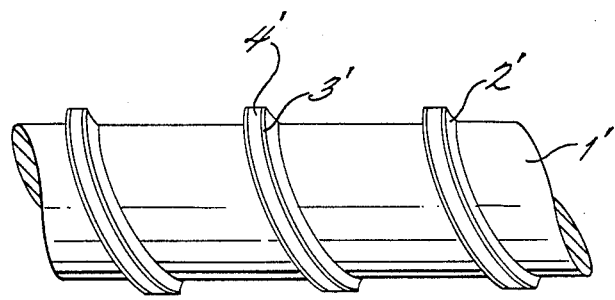
FIG. 2 shows a top view of a plurality of lands having the wear-resistant layer set into the crest track.

FIG. 2 shows a top view of screw core 1' and lands 2' containing wear-resistant alloy 4'. Alloy 4' may disposed within land 2 throughout the length of core 1' or only in certain sections as is most useful for the application.

I claim:

1. A machine part subject to wear during use comprising:
   a steel base material configured as a plastic processing screw exhibiting screw lands, and
   a wear-resistant alloy coated on and welded to crests of said screw lands by plasma powder deposition welding ,said alloy comprising by weight: 40-70% molybdenum and manganese, 0-10% chromium, 0.5-5% boron, 0-1% zirconium, 0-1% titanium, and the remainder being nickel, cobalt or mixtures of nickel and cobalt.

2. A machine part as in claim 6 wherein said screw lands comprise a crest track having a recess into which said alloy has been welded.

3. A machine part as in claim 1 wherein said alloy comprises 45-65% total of molybdenum and manganese.

4. A machine part as in claim 3 wherein said alloy comprises 50-60% total of molybdenum and manganese.

5. A machine part as in claim 1 wherein molybdenum and manganese are present in a Mn/Mo ratio of less than or equal to one.

* * * * *